US011225261B2

(12) United States Patent
Blank et al.

(10) Patent No.: US 11,225,261 B2
(45) Date of Patent: Jan. 18, 2022

(54) CROSS-DIMENSION PERFORMANCE IMPROVEMENT IN MACHINE CONTROL

(71) Applicant: Deere & Company, Moline, IL (US)

(72) Inventors: Sebastian Blank, Moline, IL (US); Dohn W. Pfeiffer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 18 days.

(21) Appl. No.: 16/281,289

(22) Filed: Feb. 21, 2019

(65) Prior Publication Data
US 2020/0269859 A1 Aug. 27, 2020

(51) Int. Cl.
*B60W 50/06* (2006.01)
*G05D 1/00* (2006.01)
*G07C 5/08* (2006.01)

(52) U.S. Cl.
CPC ........... *B60W 50/06* (2013.01); *G05D 1/0027* (2013.01); *G07C 5/085* (2013.01); *G05D 2201/0201* (2013.01)

(58) Field of Classification Search
CPC .............................................. G05D 2201/0201
See application file for complete search history.

(56) References Cited

U.S. PATENT DOCUMENTS

| 8,078,367 | B2 | 12/2011 | Sauder et al. | |
|---|---|---|---|---|
| 9,322,629 | B2 | 4/2016 | Sauder et al. | |
| 2009/0063031 | A1* | 3/2009 | Greiner | G06Q 10/08 701/117 |
| 2015/0199360 | A1* | 7/2015 | Pfeiffer | G06Q 50/02 707/723 |
| 2016/0257310 | A1* | 9/2016 | Sprock | B60W 40/08 |
| 2017/0032473 | A1 | 2/2017 | Koch et al. | |
| 2017/0147958 | A1* | 5/2017 | Hatfield | G06Q 10/063114 |

* cited by examiner

*Primary Examiner* — Imran K Mustafa
(74) *Attorney, Agent, or Firm* — Joseph R. Kelly; Kelly, Holt & Christenson PLLC

(57) ABSTRACT

A performance dimension is selected, and a gap in machine performance, according to the selected dimension, is identified. A target value is identified to improve machine control according to the selected dimension. A dependent dimension, which depends on the selected dimension, is selected and a dependency indicator, that indicates a dependency of the dependent dimension on the selected dimension, is accessed to identify a value of the dependent dimension that will change if the machine is controlled so that the value of the selected dimension is moved from a current value to the target value. The change in value of the selected dimension, and the dependent dimension are aggregated to determine whether machine control should be modified so the value of the selected dimension moves toward the target value. If so, a corresponding control operation is identified, and control signals are generated to control the machine to perform the identified control operation.

20 Claims, 11 Drawing Sheets

CROSS-DIMENSION PERFORMANCE IMPROVEMENT IN MACHINE CONTROL

FIELD OF THE DESCRIPTION

The present description relates to controlling machines. More specifically, the present description relates to improving machine control across multiple dimensions, at the same time.

BACKGROUND

There are a wide variety of different types of mobile machines. Such machines can include agricultural machines, forestry machines, construction machines, turf management machines, among others. Such machines can sometimes be difficult to control, as desired.

However, even when they are not, it can be difficult to determine how best to operate the machine, under different circumstances, in order to obtain desired performance in terms of efficiency or across other dimensions. This problem is exacerbated when the operation of a fleet of machines (the operation of more than one machine) is considered. It can be difficult to know how to control each of those machines in order to improve the overall performance of each machine, and thus the fleet.

The discussion above is merely provided for general background information and is not intended to be used as an aid in determining the scope of the claimed subject matter.

SUMMARY

A performance dimension is selected, and a gap in machine performance, according to the selected dimension, is identified. A target value is identified to improve machine control according to the selected dimension. A dependent dimension, which depends on the selected dimension, is selected and a dependency indicator, that indicates a dependency of the dependent dimension on the selected dimension, is accessed to identify a value of the dependent dimension that will change if the machine is controlled so that the value of the selected dimension is moved from a current value to the target value. The change in value of the selected dimension, and the dependent dimension are aggregated to determine whether machine control should be modified so the value of the selected dimension moves toward the target value. If so, a corresponding control operation is identified, and control signals are generated to control the machine to perform the identified control operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Some mobile machines can be controlled according to one of a number of different dimensions of performance. However, controlling the machine to improve one dimension of performance may cause performance of the machine to suffer according to a different dimension.

As just one example, agricultural machines can include combine harvesters. Such machines can be relatively complicated to operate, and they can be operated in an attempt to enhance performance according to one of many different dimensions. As two examples, the combine harvester may be controlled in one way in order to improve its performance in terms of productivity (e.g., tons of grain harvested per hour). However, this may come at the expense of another dimension, such as threshing quality, or grain loss. Similarly, by increasing the rate at which grain is harvested (productivity), performance may also suffer in terms of other dimensions, such as grain loss and perhaps even grain quality.

In some current systems, operators and even control systems, attempt to control such machines in order to optimize (or at least improve) machine performance according to one of these dimensions. However, this can reduce the overall efficiency of the machine (and of an entire fleet where multiple machines are controlled in this way) in performing the operation. It may be that, instead of focusing on productivity, for instance, both productivity and fuel economy should be considered together, in controlling the machine. This may improve the overall efficiency of the machine. Similarly, it may be that considering multiple additional dimensions (or different dimensions) along with one another may improve machine performance even further.

This has been difficult, in current systems, because the dimensions are measured in different units. Productivity, for instance, is measured in tons per hour, while grain quality may be measured in units such as a quality or percent of cracked grain. Similarly, the dimension of grain loss may be measured in strikes per second, where the grain loss sensor is a strike sensor (as will be described in greater detail below). Similarly, it has been very difficult to accurately correlate the dimensions, relative to one another, in terms of changing operation of the machine.

Thus, the present description proceeds with respect to a system that analyzes multiple dimensions, using multiple different criteria, in order to control a machine. The control can be performed in an automated, closed loop fashion, or different control operations can be surfaced for an operator and performed manually, or the control can be performed as a combination of both automated and manual control operations.

Figure 1:
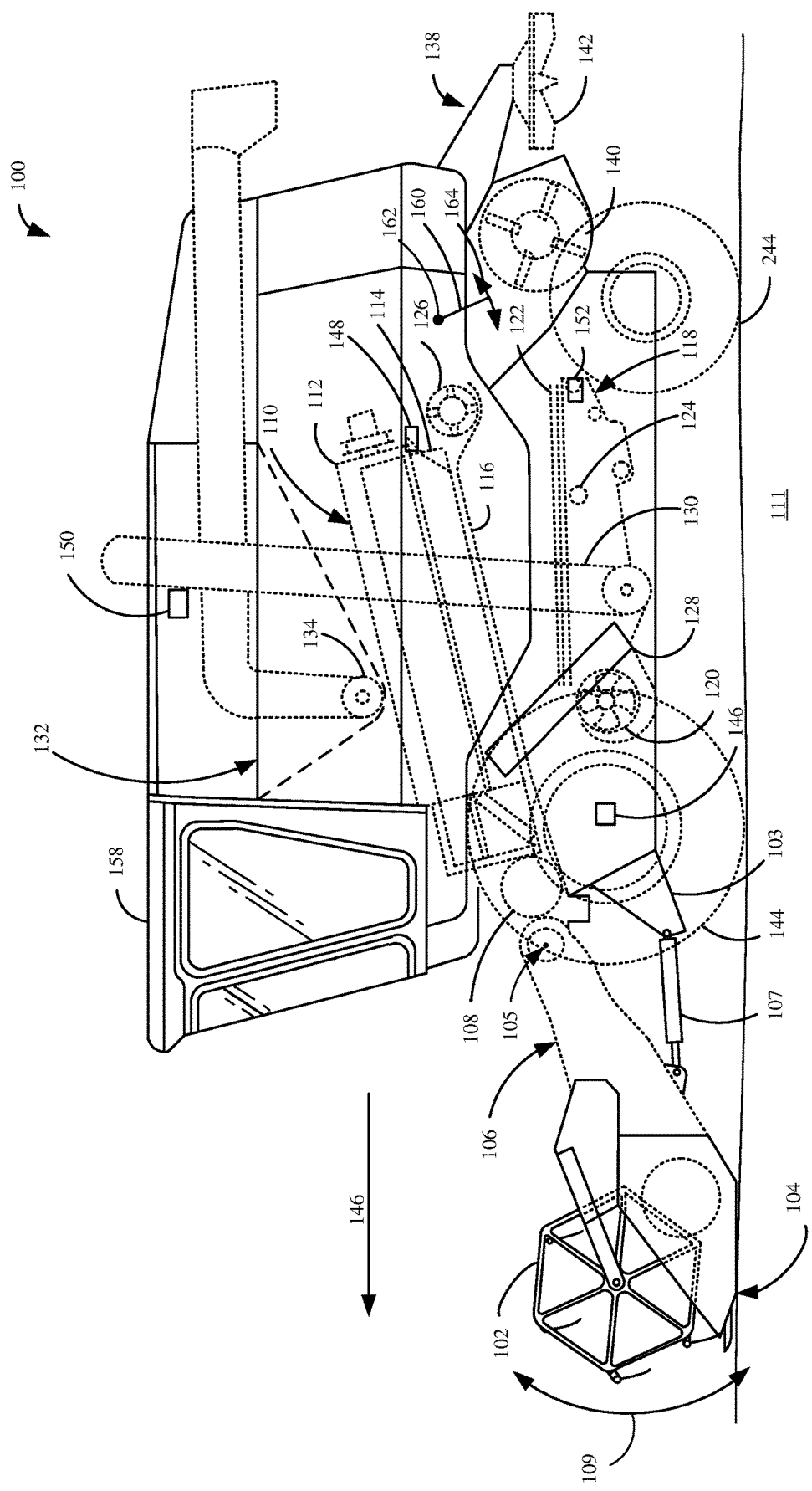
FIG. 1 is a partial pictorial, partial schematic diagram of a combine harvester.

FIG. 1 is a partial pictorial, partial schematic, illustration of a self-propelled agricultural harvesting machine 100, in an example where machine 100 is a combine harvester (or combine). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 106, a feed accelerator 108, and a thresher generally indicated at 110. Header 102 is pivotally coupled to a frame 103 of combine 100 along pivot axis 105. One or more actuators 107 drive movement of header 102 about axis 105 in the direction generally indicated by arrow 109. Thus, the vertical position of header 102 above ground 111 over which it is traveling can be controlled by actuating actuator 107. While not shown in FIG. 1, it may be that the tilt (or roll) angle of header 102 or portions of header 102 can be controlled by a separate actuator. Tilt, or roll, refers to the orientation of header 102 about the front-to-back longitudinal axis of combine 100.

Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. The operator illustratively sets a height setting for header 102 (and possibly a tilt or roll angle setting) and a control system (described below) controls actuator 107 (and possibly a tilt or roll actuator—not shown) to maintain header 102 at the set height above ground 111 (and at the desired roll angle). The control system responds to header error (e.g., the difference between the set height and measured height of header 104 above ground 111 and possibly roll angle error) with a responsiveness that is determined based on a set sensitivity level. If the sensitivity level is set high, the control system responds to, smaller header position errors, and attempts to reduce them more quickly than if the sensitivity is set lower.

After the crop is cut by cutter 104, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142.

In other configurations, the residue is simply chopped and dropped in a windrow, instead of being chopped and spread. Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are impact sensors which count grain strikes per unit of time (or per unit of distance traveled) to provide an indication of the cleaning shoe grain loss. The impact sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a header height sensor that senses a height of header 102 above ground 111. They can include stability sensors that sense oscillation or bouncing motion (and amplitude) of combine 100. They can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop size (e.g., stalk width), crop moisture, and other crop properties. They can also be configured to sense characteristics of the crop as they are being processed by combine 100. For instance, they can sense grain feed rate (e.g., mass flow rate), as it travels through clean grain elevator 130, or provide other output signals indicative of other sensed variables. Environment sensors can sense soil moisture, soil compaction, weather (which may be sensed or downloaded), temperature, standing water, and other properties of the soil, crop, machine or environment. Some additional examples of the types of sensors that can be used are described below.

Figure 2:
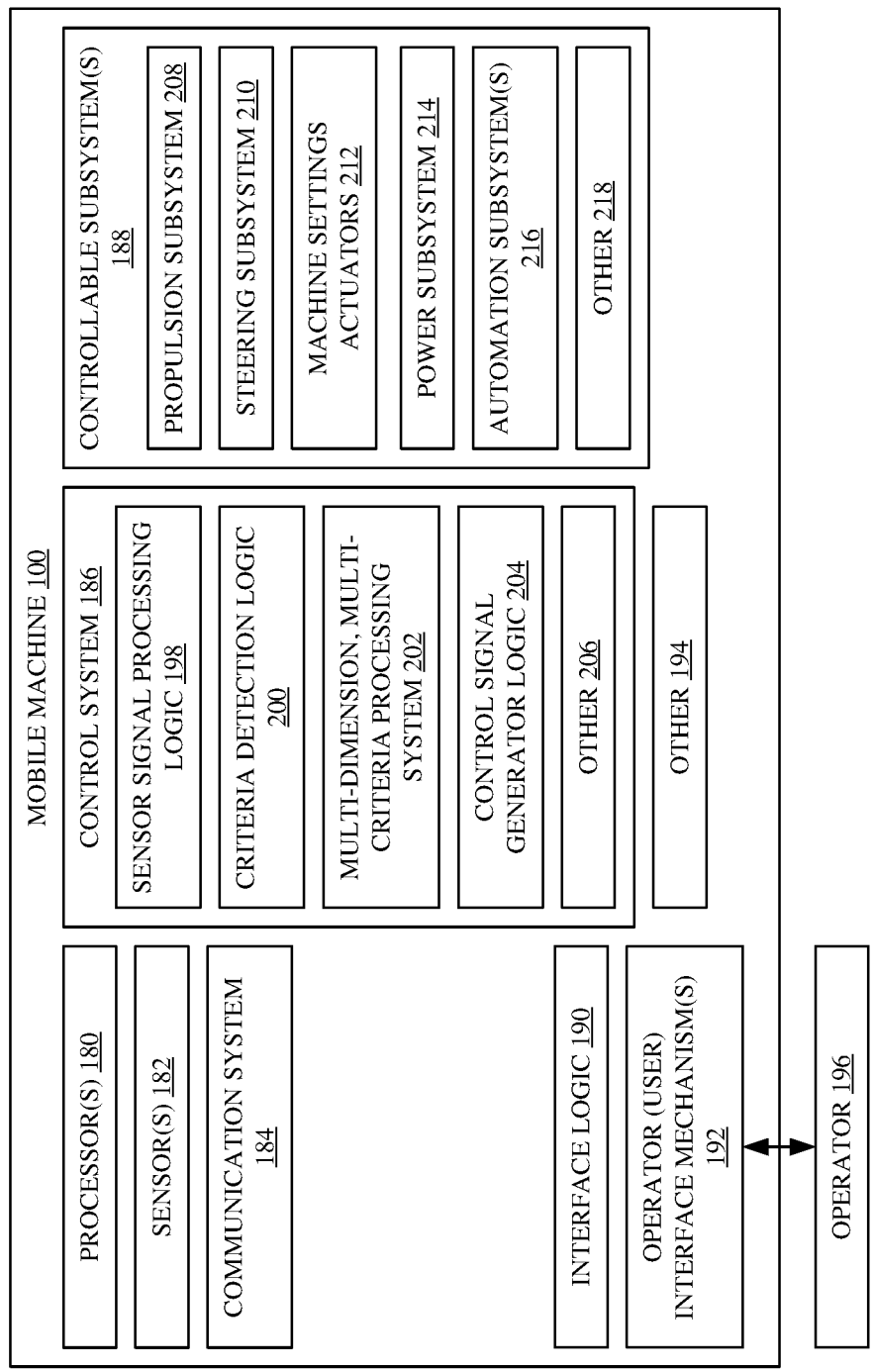
FIG. 2 is a block diagram showing one example of the combine harvester, in more detail.

FIG. 2 is a block diagram showing portions of mobile machine 100, in more detail. FIG. 2 shows that machine 100 includes one or more processors 180, sensors 182 (which may be the sensors discussed above or different or additional sensors), communication system 184, control system 186, controllable subsystems 188, interface logic 190, operator (user) interface mechanisms 192, and it can include a wide variety of other items 194. FIG. 2 also shows that, in one example, operator 196 interacts with operator interface mechanisms 192 in order to control and manipulate mobile machine 100. Thus, operator interface mechanisms 192 can include such things as levers, pedals, a steering wheel, joysticks, mechanical or other linkages, user interface displays, displays that include user actuatable elements (such as links, icons, buttons, etc.), among other things. When the user interface mechanisms 192 include speech recognition functionality, then the user interface mechanisms 192 can include a microphone and speaker for receiving user inputs by voice, and providing audible outputs. They can include speech synthesis functionality as well. Further, the user interface mechanisms 192 can include other audio, visual, haptic or other mechanisms.

Interface logic 190 can illustratively generate outputs on mechanisms 192 and detect user interactions with mechanisms 192. It can provide an indication of those interactions to other items in mobile machine 100, or it can use communication system 184 to communicate those actions to one or more remote systems. Thus, communication system 184 can include a controller area network (CAN) communication system, a near field communication system, a wide area network, a local area network, a cellular communication system, or other communication systems or combinations of systems.

Control system 186 illustratively includes sensor signal processing logic 198, criteria detection logic 200, multi-dimension, multi-criteria processing system 202, control signal generator 204, and it can include a wide variety of other items 206. Sensor signal processing logic 198 illustratively receives signals from sensors 182 and/or other sensors, and processes those sensor signals to identify sensed variables. Logic 198 can include conditioning logic which performs such things as filtering, normalization, amplification, linearization, and/or other conditioning operations. It can perform other signal processing logic as well, such as aggregation, signal combination, or other processing functions.

Criteria detection logic 200 illustratively detects criteria which are to be used by control system 186 in controlling machine 100. The criteria can be input by operator 196, they can be default criteria, they can be input by a remote user (such as a farm manager or fleet manager) or they can be input or detected in other ways as well. Those criteria can include things such as time (so that control of machine 100 is performed to increase performance with respect to time), cost (so that control of machine 100 is performed to increase performance relative to cost), or other criteria.

Multi-dimension, multi-criteria processing system 202 then performs processing on the sensor signals, given the criteria that have been detected, to identify different control operations that are to be performed in order to improve the performance of mobile machine 100, across multiple different dimensions, given the detected criteria. System 202 is described in greater detail below with respect to FIGS. 4-5D.

Once control operations have been identified by system 202, a signal indicating those operations is provided to control signal generator logic 204. Logic 204 generates control signals to control one or more of the controllable subsystems 188 in order to execute the control operation that has been identified by system 202 which will, in turn, improve machine performance of machine 100.

The controllable subsystems 188 can include any or all of the subsystems discussed above with respect to FIG. 1 (where mobile machine 100 is a combine harvester), or they can include other controllable subsystems (on a combine harvester or on other machines). Some examples of controllable subsystems include a propulsion subsystem 208 that drives movement of machine 100, steering subsystem 210 that steers machine 100, machine settings actuators 212 that are actuated to change machine settings, power subsystem 214 that may change the power usage of machine 100, and automation subsystems 216 that may change the amount of the control of machine 100 that is performed using an automated control component. For instance, it may be that steering can be automatically controlled, or manually controlled. Similarly, it may be that the speed of the machine can be automatically or manually controlled. Further, it may be that the header height of the header on machine 100 can be controlled automatically. These and a wide variety of other automation systems can be engaged and operating, or they can be disengaged or turned off. Thus, these automation subsystems 216 can be controlled (turned on or off, or otherwise configured) by the control signals generated by control signal generator logic 204.

Controllable subsystems 188 can include a wide variety of other controllable subsystems as well. This is indicated by block 218.

Figure 3:
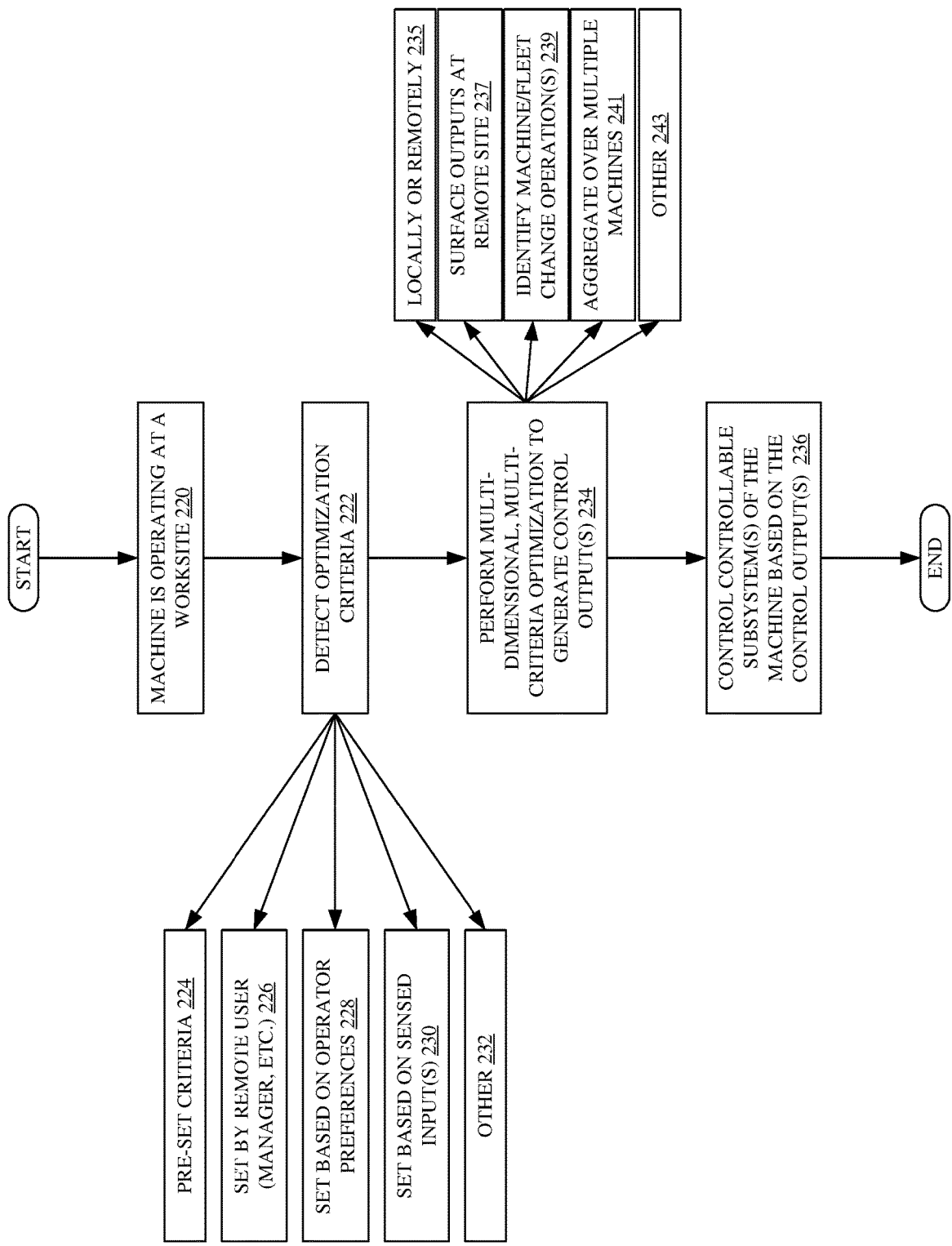
FIG. 3 is a flow diagram illustrating one example of the operation of a control system in controlling the mobile machine.

FIG. 3 is a flow diagram illustrating one example of the overall operation of mobile machine 100. It is first assumed that machine 100 is operating at a worksite. This is indicated by block 220 in the flow diagram of FIG. 3. The worksite may be a construction site, an agricultural field, a forestry site, or another site. For the purposes of the present description, it will be assumed that it is an agricultural field, and that mobile machine 100 is a combine harvester as described above with respect to FIGS. 1 and 2.

At some point, criteria detection logic 200 detects optimization criteria. These are the criteria around which multi-dimension, multi-criteria processing system 202 is to optimize or otherwise improve the performance of machine 100. This is indicated by block 222. The optimization criteria can be preset or default criteria, as indicated by block 224. They can be set by a remote user (such as a manager, etc.). This is indicated by block 226. They can be set based on operator preferences, as indicated by block 228. For instance, it may be that operator 196 prefers to operate at a higher speed, so that the harvesting operation is finished more quickly. It may be that a different operator wishes to harvest at a certain time of day. It may be that another operator wishes to obtain the most financial benefit out of the harvesting operation. All of these may be indicated as operator preferences in a profile or other file set up by operator 196 and accessed by criteria detection logic 200. Operator 196, for instance, may be asked to input identifying information before operating machine 100. This identifying information can then be used to access the user preferences, and other information.

The optimization criteria may be set based on sensed inputs. This is indicated by block 230. For instance, it may be that a weather sensor (e.g., a barometric pressure sensor) senses the approach of inclement weather. In that case, the performance criteria may be set to increase the speed at which the operation is complete. In another example, it may be that a sensor senses that the crop is moist, indicating that there is dew on the crop. In that case, it may be that the criteria are set to harvest more slowly during the morning hours and more quickly in the afternoon or evening hours when the crop is dryer. These are just examples of sensor inputs that can be used to set the optimization criteria. The optimization criteria can be set or detected in a wide variety of other ways as well, and this is indicated by block 232.

Once the criteria are detected, they are provided to multi-dimension multi-criteria processing system 202. System 202 performs multi-dimensional, multi-criteria optimization (or other processing) based on the detected criteria, in order to generate control outputs. This is indicated by block 234 and is described in greater detail below. The optimization can be performed locally on machine 100, or at a remote system (such as that described with respect to FIG. 6 below). This is indicated by block 235. The control outputs may be indicative of how machine operation should be changed and this may be surfaced at a remote system, such as the computing system for a farm manger, vendor, manufacturer, etc. This is indicated by block 237. The control outputs may identify a change in operation or configuration or settings for a given machine 100, or for a fleet of machines. This is indicated by block 239. Also, the aggregate change value discussed below with respect to FIG. 5 can be further aggregated over a fleet of machines to obtain a fleet aggregate value, and the control outputs can be based on or indicate that value as well. This is indicated by block 241. The optimization can be done in other ways as well, as indicated by block 243.

The control outputs may be indicative of a control operation that is to be performed in order to increase the performance of machine 100, along identified dimensions, given the detected criteria. This control operation (or another indicator of control output) can be provided to control signal generator 204. Control signal generator 204 then generates control signals to control one or more of the controllable subsystems 188 of the machine 100 based upon the control outputs from system 202. Controlling the controllable subsystems 188 is indicated by block 236 in the flow diagram of FIG. 3.

Figure 4:
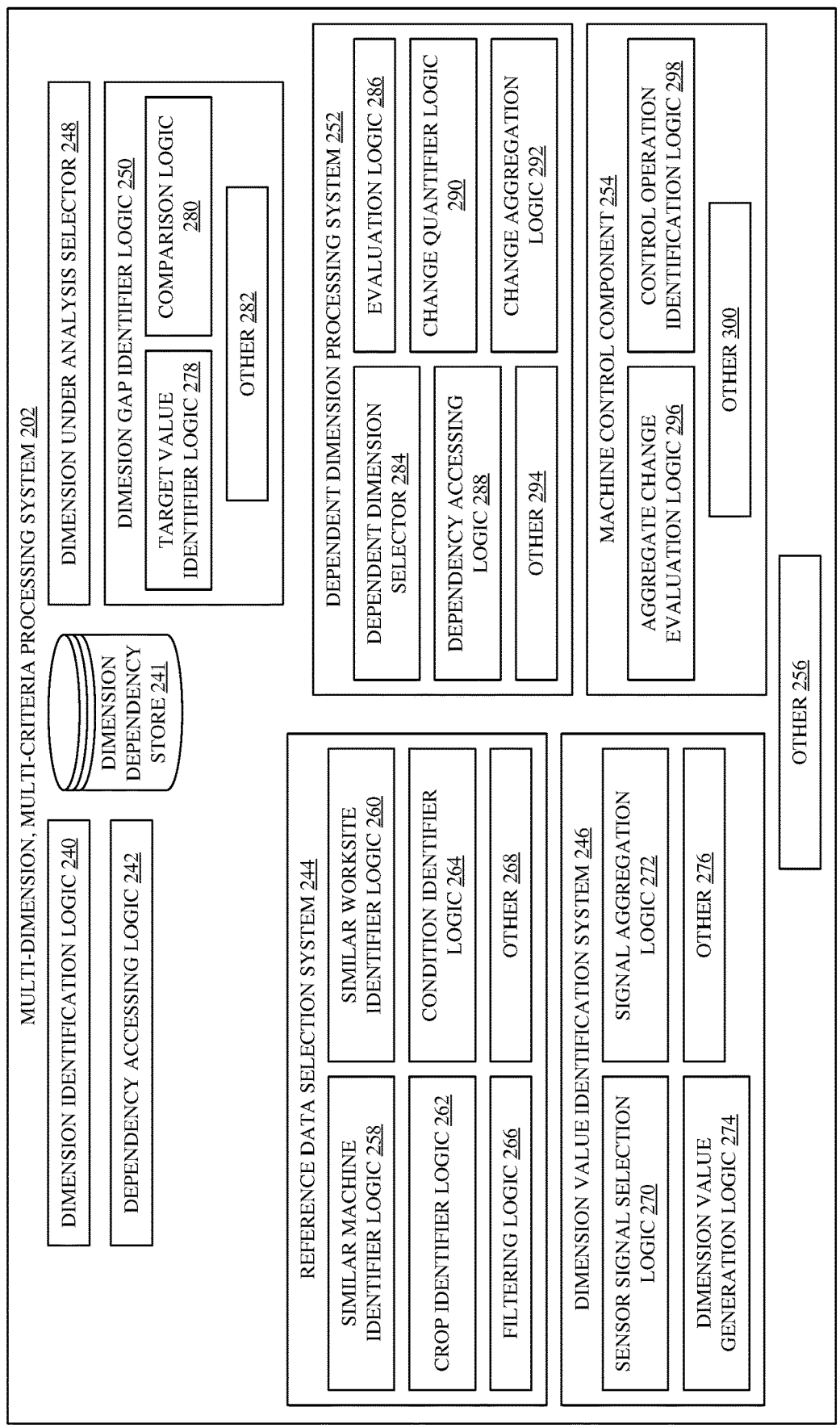
FIG. 4 is a block diagram showing one example of a multi-dimension, multi-criteria processing system, in more detail.

FIG. 4 is a block diagram showing one example of multi-dimension, multi-criteria processing system 202 in more detail. In the example shown in FIG. 4, system 202 illustratively includes dimension identification logic 240, dimension dependency store 241, dependency accessing logic 242, reference data selection system 244, dimension value identification system 246, dimension under analysis selector 248, dimension gap identifier logic 250, dependent dimension processing system 252, machine control component 254, and it can include a wide variety of other items 256. Reference data selection system 244, itself, can include similar machine identifier logic 258, similar worksite identifier logic 260, crop identifier logic 262, condition identifier logic 264, filtering logic 256, and it can include other items 268. Dimension value identification system 246 can, itself, include sensor signal selection logic 270, signal aggregation logic 272, dimension value generation logic 274, and it can include other items 276. Dimension gap identifier logic 250 can, itself, include target value identifier logic 278, comparison logic 280, and it can include other items 282. Dependent dimension processing system 252 can, itself, include dependent dimension selector 284, evaluation logic 286, dependency accessing logic 288, change quantifier logic 290, change aggregation logic 292, and it can include other items 294. Machine control component 254 can, itself, include aggregate change evaluation logic 296, control operation identification logic 298, and it can include other items 300. Before describing the operation of multi-dimension, multi-criteria processing system 202 in more detail, a brief description of some of the items in system 202, and their operation, will first be provided.

Dimension identifier logic 240 illustratively identifies the particular dimensions that system 202 will work on, in order to improve or optimize the performance of machine 100. The dimensions can be default dimensions, pre-configured dimensions, operator-entered dimensions, or they can be obtained in another way.

Dimension dependency store 241 illustratively stores dependencies among various dimensions. For instance, it can store equations or algorithms, or other items, that identify a correlation between the various dimensions and indicate how a dependent dimension will change, when another dimension, on which it depends, changes. For instance, a fuel efficiency dimension may have a different value, based on changes in machine productivity. Thus, if the operator controls machine 100 to increase its productivity, then the dependency stored in dimension dependency store 241, which identifies the dependency relationship of the fuel efficiency dimension on the productivity dimension, will indicate how the change in productivity on machine 100 affects the value of the fuel efficiency dimension.

In one example, there is a single dimension dependency identifier, for each dependent dimension and for each dimension for which it depends. Thus, if fuel efficiency is dependent on productivity, then data store 241 stores an algorithm, equation, or other identifier that identifies that dependency relationship. If fuel efficiency is also dependent on power usage, then data store 241 may also include a dependency identifier that identifies or specifies that dependency relationship.

In another example, the dependency may change with context. For instance, the dependency may change depending on the type of crop being harvested, on the environmental conditions, on the particular machine 100 that is being used, on the operator that is operating the machine, or based on other context information. In that case, data store 241 may include a dependency identifier, for each dimension, and for each set of context information. Therefore, continuing with the example discussed above, the fuel efficiency dimension may have a dependency identifier that identifies its dependency on productivity when the harvested crop is corn. It may include a different dependency identifier that identifies its dependency when the harvested crop is soybeans, wheat, etc. Similarly, it may include one dependency when the harvested crop is corn and when the conditions are dry. It may include a different dependency when the harvested crop is corn, but the conditions are wet. These are just examples of the different types of dependency identifiers that can be included in data store 241.

All of these dependencies can be learned empirically by collecting data and using statistical analysis to identify the dependency relationships among the various dimensions, under different conditions, with different crops, etc. The dependencies can also be generated using a machine learning system that generates a predictive model that is used to predict dependencies. Thus, the model may predict dependencies, on-the-fly, as a crop is being harvested. It may predict dependencies prior to a harvesting operation beginning, and then modify those dependencies as the operation continues. The dependencies can be static or modified dynamically in other ways as well. Those discussed herein are discussed for the sake of example only.

Dependency accessing logic 242 accesses the dependencies (or dependency identifiers) when needed for processing in system 202. Thus, dependency accessing logic 242 can receive sensor signals indicative of context or other information that may be used in identifying the different dependency identifiers in data store 241.

In order to determine whether the operation of machine 100 can be improved, the values of one or more of the different dimensions that are considered for analysis are compared against reference data to determine whether their value is reasonable, or whether it can be improved, given the current machine and context. The reference data may be generated from other operators, operating similar machines in different, but similar, fields, under similar conditions. The reference data may also be obtained from historical records indicating historical dimension values for the current field, with the same crop type, under similar conditions. The reference data may be from the same operator and the same machine, having performed previous operations, or it may be from other operators and other machines in the same fleet of machines (e.g., owned and operated by the same farm entity), or it may be from other machines owned by others, and operated by different operators across a wide geographic region, but under similar contextual circumstances.

Thus, similar machine identifier logic 258 has access to a machine identifier identifying a current machine, so that it can identify similar machines. The current machine identifier may identify the make, model, and configuration of the current machine. This may be used to access information that indicates similar machines in a remote reference data repository, or in a reference data store that is stored on machine 100.

Similar worksite identifier logic 260 illustratively identifies characteristics of a current worksite, so that it can then identify similar worksites in the reference data. Thus, it may identify a topography of the current worksite, a geographic location of the current worksite, environmental characteristics of the current worksite (e.g., soil moisture, soil compaction, etc.), among other things. Crop identifier logic 262 identifies a crop that is currently being harvested, so that this can be used to identify reference data for the same crop type. Condition identifier logic 264 identifies contextual information that may be indicative of the environment in which machine 100 is operating. This may include the time of day, crop moisture, whether there is downed crop, temperature, barometric pressure, other weather conditions, etc.

Filtering logic 266 then uses the information generated by logic 258, 260, 262, and 264 and also uses communication system 184 (shown in FIG. 2) to communicate with a remote data store to filter data in the remote data store to identify reference data. The reference data will illustratively include values (or value ranges) for the different dimensions that are to be used by system 202. Thus, filtering logic 266 can filter the reference data to obtain reference data that is from a similar machine, at a similar worksite, working on the same crop, under similar conditions, etc.

The values of the different dimensions in the reference data can be provided to dimension gap identifier 250 to identify a difference between the values for the dimensions in the reference data and the values for the dimensions generated by machine 100 during a current operation. In order to do this, the current values of the different dimensions are generated by dimension value identification system 246.

Sensor signal selection logic 270 illustratively selects the various sensor signals (or sensor signal values) that are needed to identify the dimension values to be identified. For instance, if productivity is to be analyzed, then the sensor signal selection logic 270 illustratively selects sensor signals or sensor signal values that can be used to identify a current productivity for machine 100 (e.g., tons of harvested material per hour). If fuel efficiency is to be used as a dimension, then sensor signal logic 270 selects sensor signals (or sensor signal values) that can be used to identify fuel efficiency (e.g., liters of fuel per ton of harvested material).

Signal aggregation logic 272 can perform different aggregations or combinations of the sensor signals (or sensor signal values) in order to generate the dimension values. For instance, a sensor signal may identify a rate of fuel usage. A different sensor signal (or combination of sensor signals) can be used to identify yield. Signal aggregation logic 272 can combine or aggregate those signals over a particular time period (or distance traveled), or in other ways. Dimension value generation logic 274 can then generate a current value for the selected dimension.

Dimension value identification system 246 can do this for each of the dimensions to be considered by system 202. It can perform this operation continuously on all dimensions simultaneously, or it can rotate through generating values for the different dimensions periodically or otherwise intermittently.

Dimension under analysis selector 248 then selects a dimension for evaluation. For instance, if a dimension to be analyzed is productivity, it selects the productivity dimension. It should be noted that, in one example, all of the dimensions can be evaluated against the reference data simultaneously. In another example, the dimensions can be selected for evaluation according to a hierarchy or preferentially in another way. In yet another example, the dimensions can simply be selected for evaluation in a predetermined or dynamically modified sequence so that they are all evaluated intermittently.

Dimension gap identifier logic 250 then identifies a gap between the current value generated by dimension value identification system 246 (generated based on current operation of machine 100), and the value for that dimension identified in the reference data. In doing so, target value identifier logic 278 identifies a target value for the dimension, based on the reference data. By way of example, the target value may be the same value as that identified in the reference data. In another example, the reference data may identify a range of values and the target value may be identified as a value within a certain portion of that range (e.g., and the top 10% of the range of values). Comparison logic 280 then compares the current value for the dimension generated by dimension value identification system 246 (for machine 100) against the target value identified by logic 278 to determine a gap between those two values. Comparison logic 280 also determines whether the gap is sufficient to possibly change operation of machine 100 in order to change the current value of the dimension under analysis for machine 100 so that it may more closely approach the target value. By way of example, if the current value for the machine is within a threshold percent or a threshold amount of the target value, then in one scenario no action is taken. However, if the current value for the dimension is outside that threshold, then it may be that comparison logic 280 determines that the gap between current performance and that identified by the reference data is sufficient to warrant a possible change in machine operation.

Once it is determined that a possible change in machine operation should be made so that the current value of the dimension under analysis more closely conforms to the target value, then the dependent dimensions are considered. Dependent dimension processing system 252 identifies an effect on the dependent dimensions (that are dependent on the dimension under analysis) to see what the overall effect of changing machine operation will have on the overall performance of machine 100, according to all of the dimensions being considered, and the evaluation criteria.

Therefore, dependent dimension selector 284 accesses dimension dependency store 241 to identify all other dimensions that are dependent on the dimension under analysis. Dependency accessing logic 288 accesses data store 241 to obtain the relevant dependency relationship, and evaluation logic 286 evaluates how the value of the dependent dimension will change, if the value of the dimension under analysis moves from its current value to the target value. Change quantifier logic 290 quantifies this change so that it is expressed in similar units as the change in the dimension under analysis. Change aggregation logic 292 aggregates the changes, for all dependent dimensions, so that an aggregate level of change, in relevant units, can be identified.

By way of example, assume that one of the evaluation criteria is time. Increasing productivity may reduce the amount of time needed to harvest the field. However, the fuel efficiency dimension may indicate that, if productivity is increased, fuel efficiency will go down, which may cause machine 100 to make additional stops for refueling. Thus, this may contribute to an increase in time needed to harvest the field. Change aggregation logic 292 thus aggregates the changes in units (in this case, minutes or hours) corresponding to the criteria for evaluation (in this case, time), so that the overall effect of changing machine operation so that the value of the dimension under analysis changes, can be seen.

Thus, the overall change in common units (in this case hours or minutes) is provided to machine control component 254. Aggregate change evaluation logic 296 evaluates the aggregate change generated by change aggregation logic 292 to determine whether action should be taken. For instance, if machine operation is being evaluated based upon speed (or time), and the overall change would increase the time to perform the operation, then aggregate change evaluation logic 296 may evaluate that change in time and determine that no change in machine operation should be performed. However, if the aggregate change decreases the time (or increases the speed) with which the operation can be performed, then logic 296 may indicate that a change should be made to the machine operation.

Similarly, logic 296 can consider multiple criteria, simultaneously. For instance, if change in machine operation will result in a modest aggregate increase in speed with which the machine operation is performed, but that change will also result in a dramatic decrease in fuel efficiency, then those two criteria may be simultaneously considered to determine a point at which it makes sense to change machine operation. Therefore, aggregate change evaluation logic 296 can evaluate not only the change based on one particular criterion, but may consider multiple criteria as well.

When logic 296 generates an output indicating that a machine control operation should be changed, the control operation identification logic 298 identifies the change that is to be made. It can access a mapping that maps between dimension value changes and machine operation changes. It can access a machine learned and dynamic model that identifies the particular dimension value or values that are to be changed and generates an output identifying the machine operation that is to be changed. The machine learned model can be a neural network, a fuzzy logic model, a Markov model, or other models. It can identify machine operations that are to be changed in other ways as well.

Figure 5A:
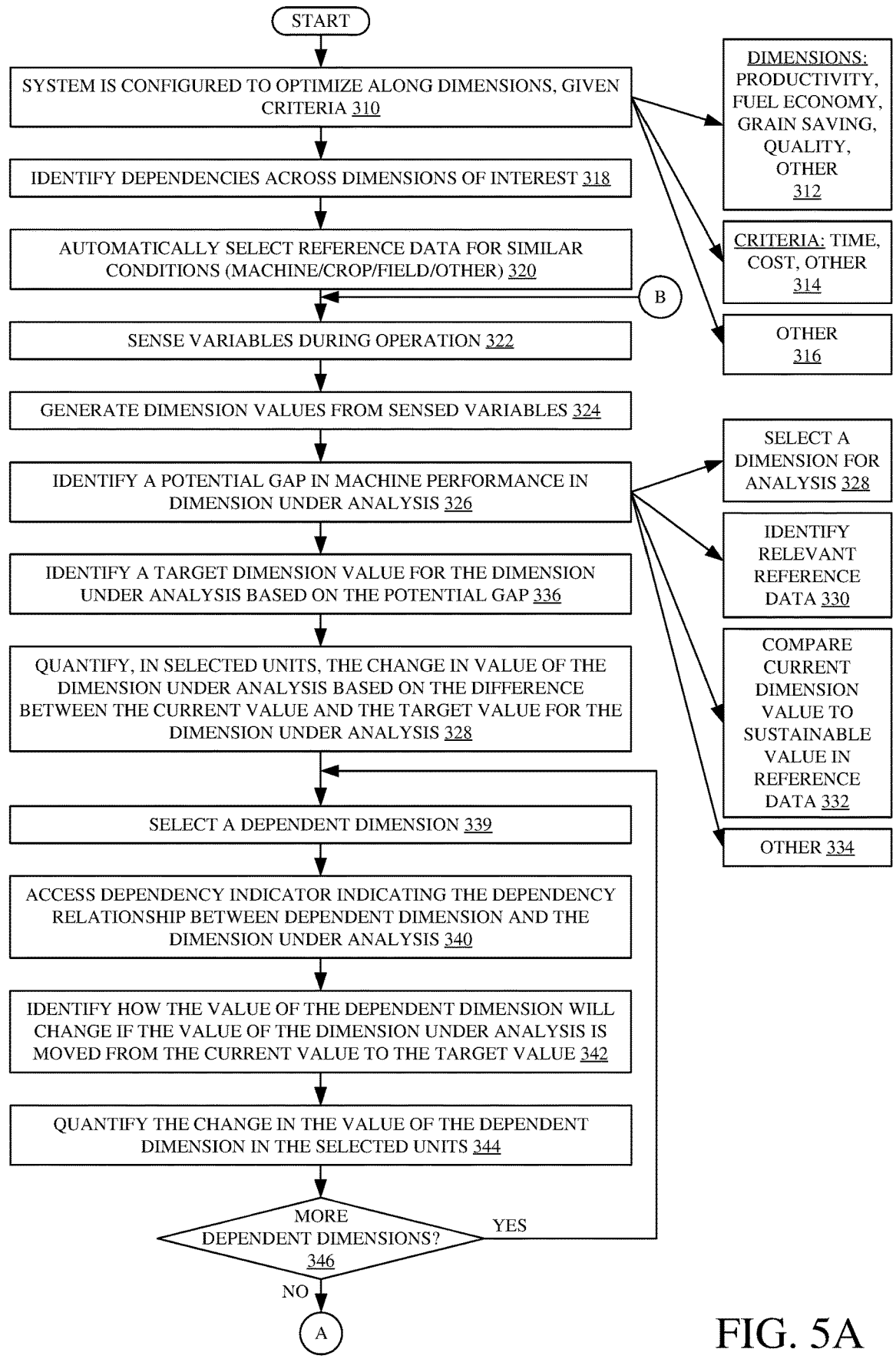
FIGS. 5A and 5B (collectively referred to herein as FIG. 5) illustrate a flow diagram showing one example of the operation of the multi-dimension, multi-criteria processing system.
Figure 5B:
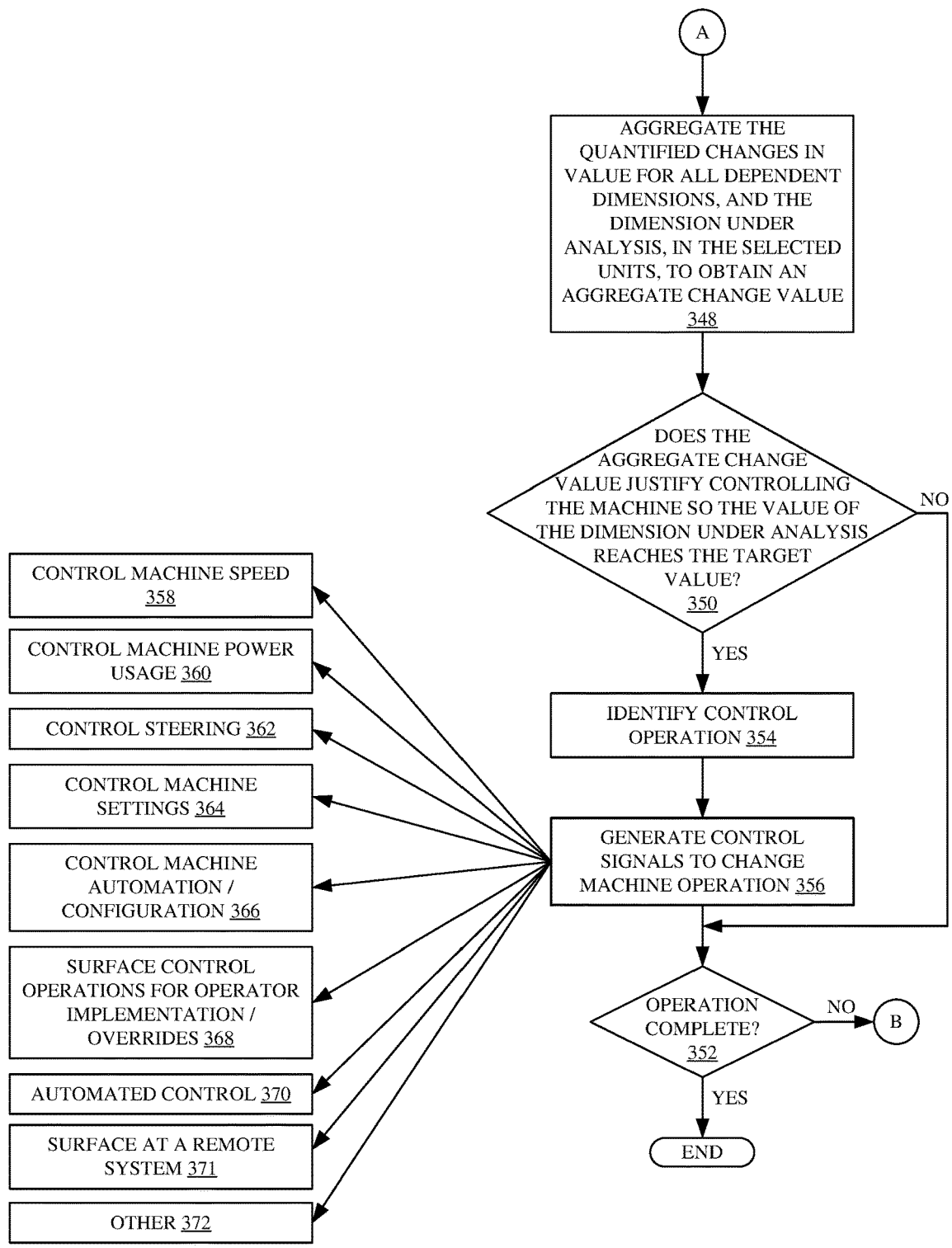

FIGS. 5A and 5B (collectively referred to herein as FIG. 5) illustrate a flow diagram showing one example of the operation of multi-dimension, multi-criteria processing system 202, in more detail. It is first assumed that mobile machine 100 has been configured to optimize its operation (or at least improve its operation) along a plurality of different dimensions, given a set of criteria. This is indicated by block 310 in the flow diagram of FIG. 5. In one example, the dimensions can include such things a productivity, fuel economy, grain savings, grain quality, etc. This is indicated by block 312. The criteria may include such things as time, cost, and other criteria. This is indicated by block 314. Machine 100 can be configured to improve performance along other dimensions, given other criteria as well. This is indicated by block 316.

Dimension identification logic 240 can identify these dimensions, or detect them. It can also identify or detect the different criteria.

Dependency accessing logic 242 identifies the dependency identifiers (such as those stored in dependency store 241) which indicate the correlations (or dependency relationships) among the different dimensions. Identifying the dependency identifiers across the dimensions of interest is indicated by block 318 in the flow diagram of FIG. 5.

Reference data selection system 244 then automatically selects reference data for similar conditions (machine/crop/yield/other), or it can be previously selected. This is indicated by block 320. As discussed above, similar machine identifier logic 258 can identify the current machine so data from similar machines can be obtained. Similar worksite identifier logic 260 can identify characteristics of the current worksite so reference data from similar worksites can be obtained. Crop identifier logic 262 and condition identifier logic 264 can identify the current crop and conditions. All of this information can be used by filtering logic 266 to filter data to identify relevant reference data (data for similar machines at similar worksites processing the same type of crop under similar conditions, etc.).

Dimension value identification system 246 can then generate values for each of the dimensions that were identified by dimension identification logic 240 (discussed above with respect to block 310). As discussed above, different sensor signals or sensor signal values may be obtained and aggregated in different ways in order to generate values for the different dimensions that are to be considered by processing system 202. Sensing variables during operation is indicated by block 322, and generating dimension values from the sensed variables is indicated by block 324 in the flow diagram of FIG. 5.

Dimension under analysis selector 248 then selects a dimension for analysis and dimension gap identifier logic 250 identifies a gap between a current value for the selected dimension and a target value for the selected dimension. Identifying the gap is indicated by block 326 in the flow diagram of FIG. 5. To do this, selector 248, selects a dimension for analysis, indicated by block 328. Target value identifier logic identifies a target value for the dimension under analysis, based on the identified reference data for that dimension as indicated by block 330. Comparison logic 280 then compares the current dimension value to a sustainable value (the target value) in the reference data is indicated by block 332 to identify the gap. Identifying a gap in machine performance can be identified in other ways as well, and this is indicated by block 334.

Based on the gap, target value identifier logic 278 can identify a different target value for the dimension under analysis. This is indicated by block 336. The target value can be the same as used above at block 330 as well. Dependent dimension processing system 252 then quantifies, in selected units (which are based on the criteria being considered), the change in value of the dimension under analysis based on the difference between the current value and the target value for the dimension under analysis. This is indicated by block 338.

As discussed above, once the gap is quantified, then that gap is identified in units so that it can be aggregated with changes in other dimension values. The units correspond to the criteria that are selected, and may be such things as time units, monetary units, etc.

Dependent dimension selector 284 then selects a dependent dimension to be processed. This is indicated by block 339. Dependency accessing logic 288 accesses the dependency indicator in data store 241 that indicates the dependency relationship between the dependent dimension and the dimension under analysis. This is indicated by block 340. Evaluation logic 286 then identifies how the value of the dependent dimension will change if the value of the dimension under analysis is moved from the current value to the target value, by changing machine operation. This is indicated by block 342. Change quantifier logic 290 then quantifies the change in the value of the dependent dimension, again in the selected units so that it can be aggregated with the change to the dimension under analysis. This is indicated by block 344.

Dependent dimension selector 284 then determines whether there are any more dimensions that are being considered by system 202, that are dependent on the dimension under analysis. If so, then processing reverts to block 339 where the next dependent dimension is selected for processing. Determining whether there are more dependent dimensions to process is indicated by block 346.

Once all of the dependent dimensions have been identified and processed, then change aggregation logic 292 aggregates the quantified changes in values for all the dependent dimensions, and the dimension under analysis, to obtain an aggregate change, in the selected units, based on the criteria for which the change is being analyzed. As discussed above, the dependent dimensions may increase or decrease the value of the aggregate change in the selected units. By way of example, a change to one dimension may increase the time it takes to perform the harvesting operation while a change in another dimension may decrease the time. Aggregating these two values will offset one against the other to obtain a net or aggregate change in the time needed to complete the operation. This type of aggregation is performed by combining the dimension change values for the dimension under analysis and all of the dependent dimensions to obtain the aggregate change value. Aggregating the quantified changes is indicated by block 348 in the flow diagram of FIG. 5.

The aggregate change is then evaluated by aggregate change evaluation logic 296 to determine whether it justifies controlling the machine so that the value of the dimension under analysis moves towards (or reaches) the target value. This is indicated by block 350 in the flow diagram of FIG. 5.

As discussed above, in making this evaluation, logic 296 may also consider how the aggregate change affects other criteria. For instance, an aggregate change that reduces the amount of time to perform the harvesting operation may also drastically decrease fuel efficiency, and increases grain loss, which increases the monetary cost of the harvesting operation. In that case, the two criteria are weighed against one another to determine whether the machine operation change should be made. The criteria can be arranged hierarchically, they can be weighted or related to one another by an algorithm, or they can be arranged according to operator preference or other user preferences, or they can be considered in other ways.

If the aggregate change does not justify controlling the machine to change the value of the dimension under analysis to the target value, then operation skips to block 352 where it is determined whether the harvesting operation is complete. If not, processing again reverts to block 322 where variables are sensed and dimension values are updated.

However, if, at block 350, logic 296 determines that machine operation should be changed, then an indication of this is provided to control operation identification logic 298. Logic 298 determines what control operation is to be performed in order to change the value of the dimension under analysis from its current value to the target value. By way of example, if productivity is to be increased from one level to the target level, then the speed of the machine 100 may need to be increased by a certain amount. This is just one example. Again, the operations to be performed can be mapped to dimension change values or they can be determined dynamically or in other ways. Identifying the control operation to perform is indicated by block 354.

The identified control operation is provided to control signal generator logic 204 (shown in FIG. 1) which generates control signals to change the machine operation (or to perform the identified control operation). This is indicated by block 356. The control signals are applied to one or more controllable subsystems 188 in order to accomplish the identified control operation. For instance, they can be applied to propulsion subsystem 208 to control machine speed. This is indicated by block 358. They can be provided to power subsystem 214 to change machine power usage. This is indicated by block 360. They can be applied to steering subsystem 210 to control machine steering. This is indicated by block 362. They can be applied to machine settings actuators 212 in order to control the machine settings. This is indicated by block 364. They can be applied to automation subsystem 216 in order to control machine automation or machine configuration. This is indicated by block 366.

In another example, the control signal generator logic 204 can generate control signals to control interface logic 190 to surface the identified control operation for operator implementation or override by operator 196. This is indicated by block 368. For instance, it may be that system 202 determines that machine speed should be reduced (so as to reduce grain loss). In that case, this operation may be surfaced for operator 196 so that operator 196 has a chance to override it. By way of example, it may be that operator 196 has determined (based upon observation) that a thunderstorm is approaching. In that case, operator 196 may override the control operation that is supposed to reduce machine speed. Instead, operator 196 may deem it more important to suffer higher grain loss, but complete the harvesting operation, instead of to reduce grain loss, but not get the harvesting operation completed before the thunderstorm arrives. If operator 196 overrides the recommended control operation, then it may be dismissed. However, if operator 196 authorizes the control operation, then it may be automatically performed.

In another example, the recommended control operation may be surfaced for operator 196, and it may be manually implemented by operator 196. In yet another example, some control operations may be surfaced for manual implementation, while others are automatically performed or are surfaced for potential operator override. All of these and other scenarios are contemplated herein. Automatically controlling the machine based upon the identified control operation is indicated by block 370. The control signals can be sent to, and surfaced at, a remote computing system. This is described in greater detail below with respect to FIG. 6 and is indicated by block 371 in the flow diagram of FIG. 5. The control signals can be generated to change machine operation in other ways as well, and this is indicated by block 372.

Once the identified control operation is performed (or overridden) processing again proceeds at block 352. If the harvesting operation is not yet complete, then processing reverts to block 322 where it continues.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
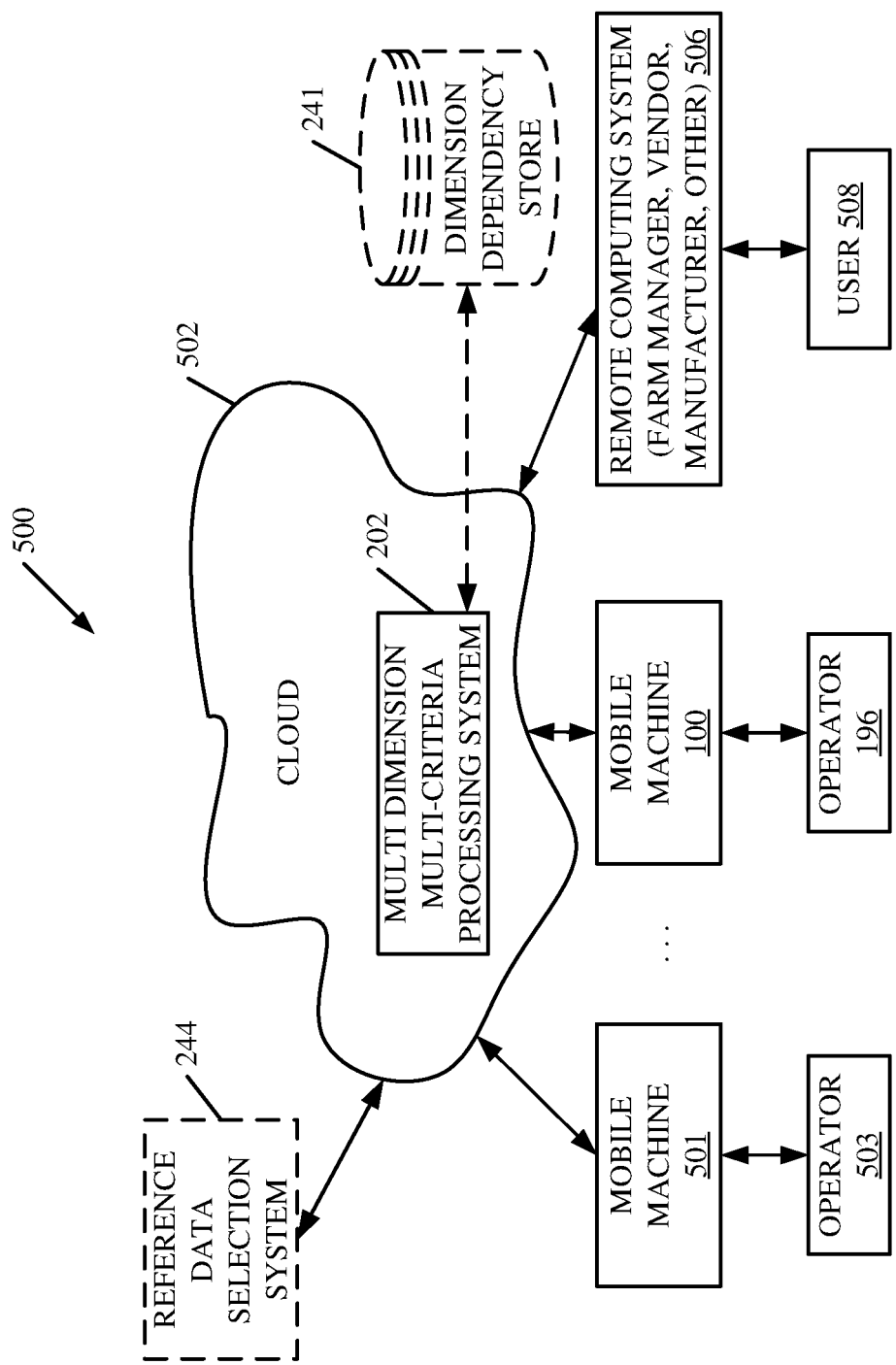
FIG. 6 is a block diagram showing one example of the mobile machine, disposed in a remote server architecture.

FIG. 6 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 2 and 4 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIGS. 2 and 4 and they are similarly numbered. FIG. 6 specifically shows that multi-dimension, multi-criteria processing system 202 can be located at a remote server location 502. Therefore, harvester 100 accesses those systems through remote server location 502.

FIG. 6 also depicts another example of a remote server architecture. FIG. 6 shows that it is also contemplated that some elements of FIGS. 2 and 4 are disposed at remote server location 502 while others are not. In FIG. 6 for example, system 202 is located in cloud 502 and it can be used by multiple machines (such as machine 100 and machine 501, which may be similar to machine 100, or different, and which has its own operator 503). Thus, system 202 can generate aggregated fleet values that are similar to the aggregate change value discussed above with respect to FIG. 5, but which are aggregated across multiple different machines.

Similarly, FIG. 6 shows that some items may be located in still different locations. By way of example, data store 241 or reference data selection system 244 can be disposed at a location separate from location 502, and accessed through the remote server at location 502. Regardless of where they are located, they can be accessed directly by harvester 100, and machine 501, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an examples, where cell coverage is poor or non-existent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

Further, FIG. 6 shows that architecture 500 can include a remote computing system 506 that is used by another user

508. System 202 can thus send the various values and control outputs to remote computing system 506 where they are surfaced for user 508. System 506 may thus be a computing system that is remote from machines 100, 501. It may be a farm or fleet manger's system, a vendor's system, a manufacturer's system, etc.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
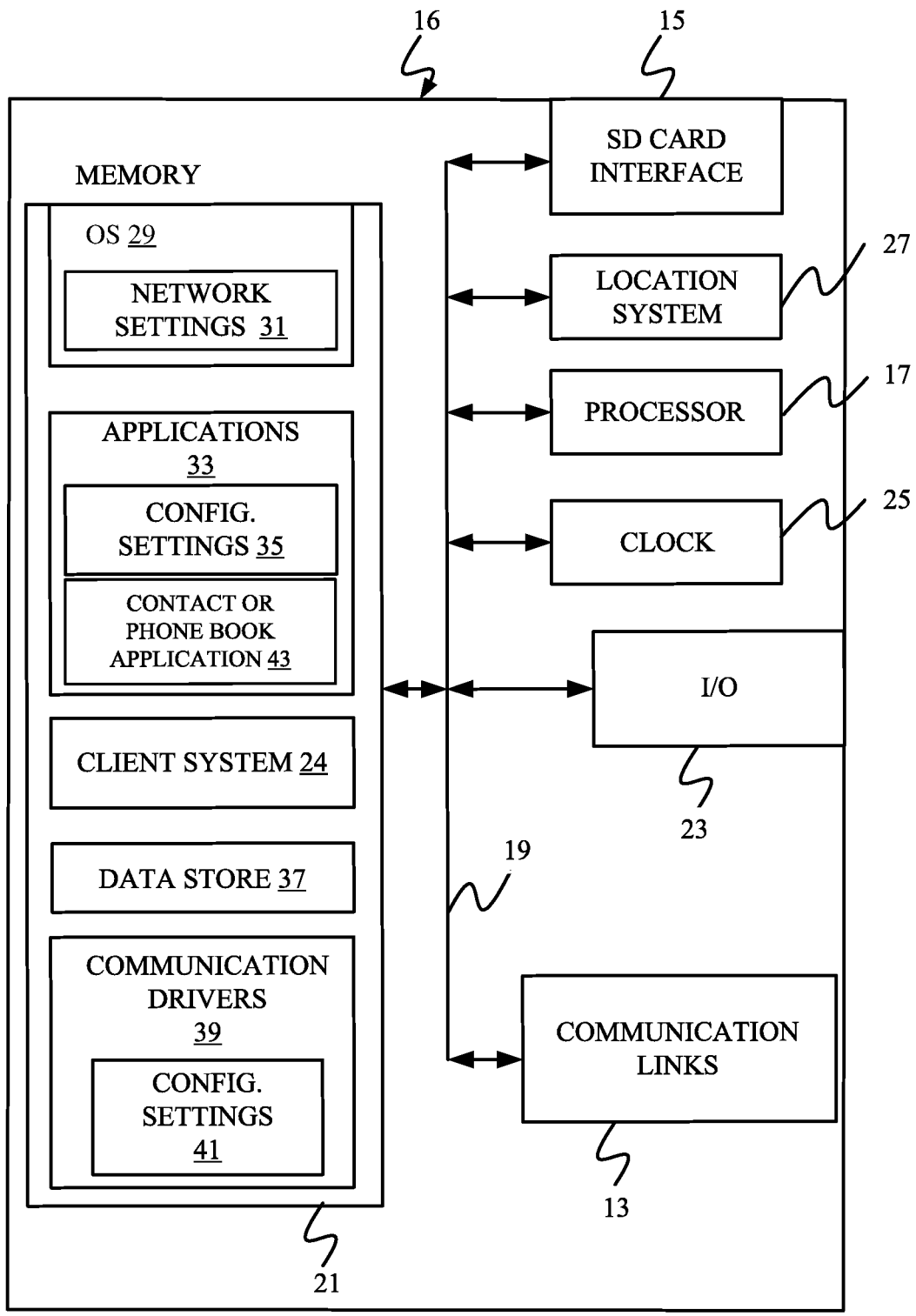
FIGS. 7-9 show examples of mobile devices that can be used in the architectures shown in the previous FIGS.
Figure 8:
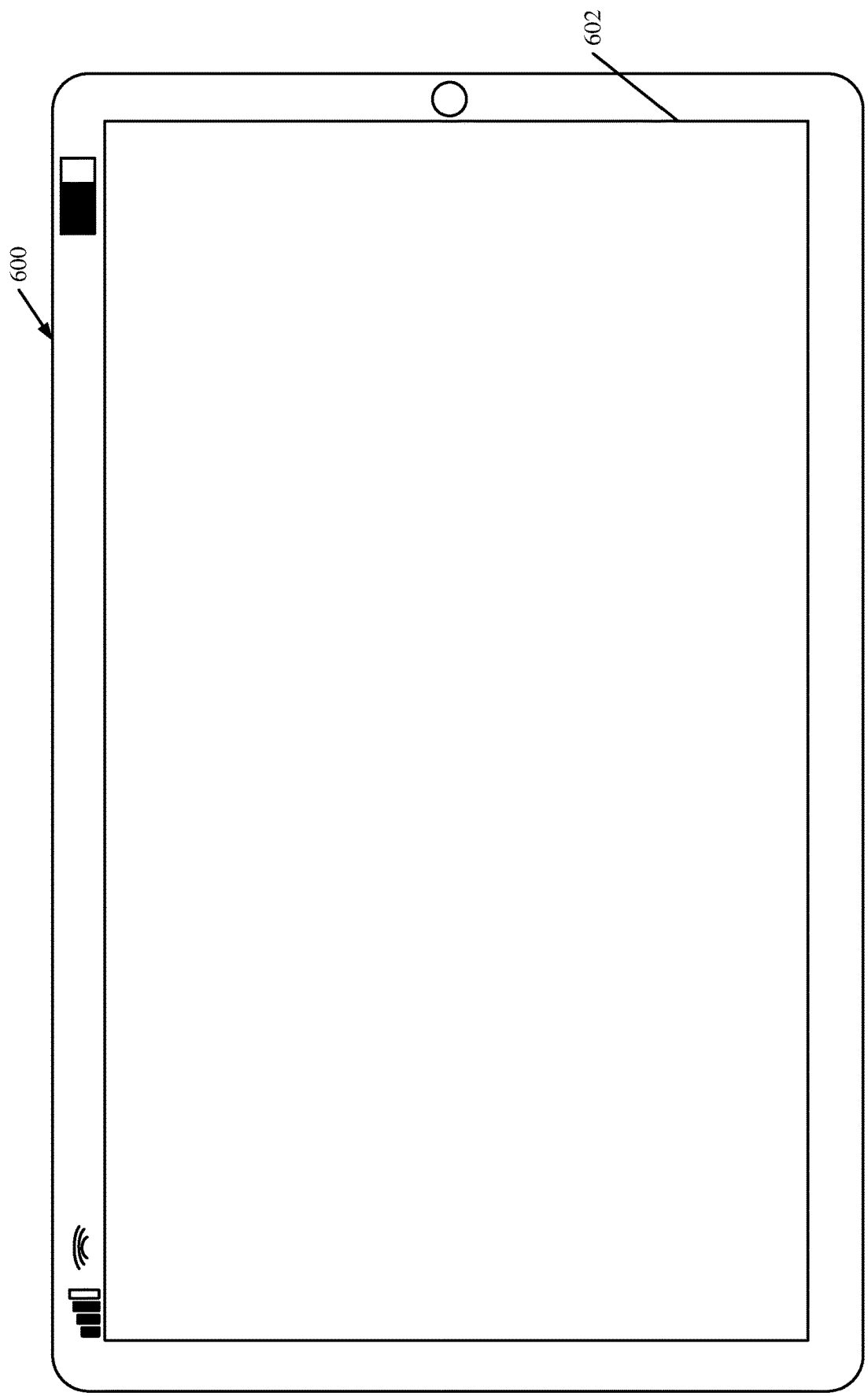
Figure 9:
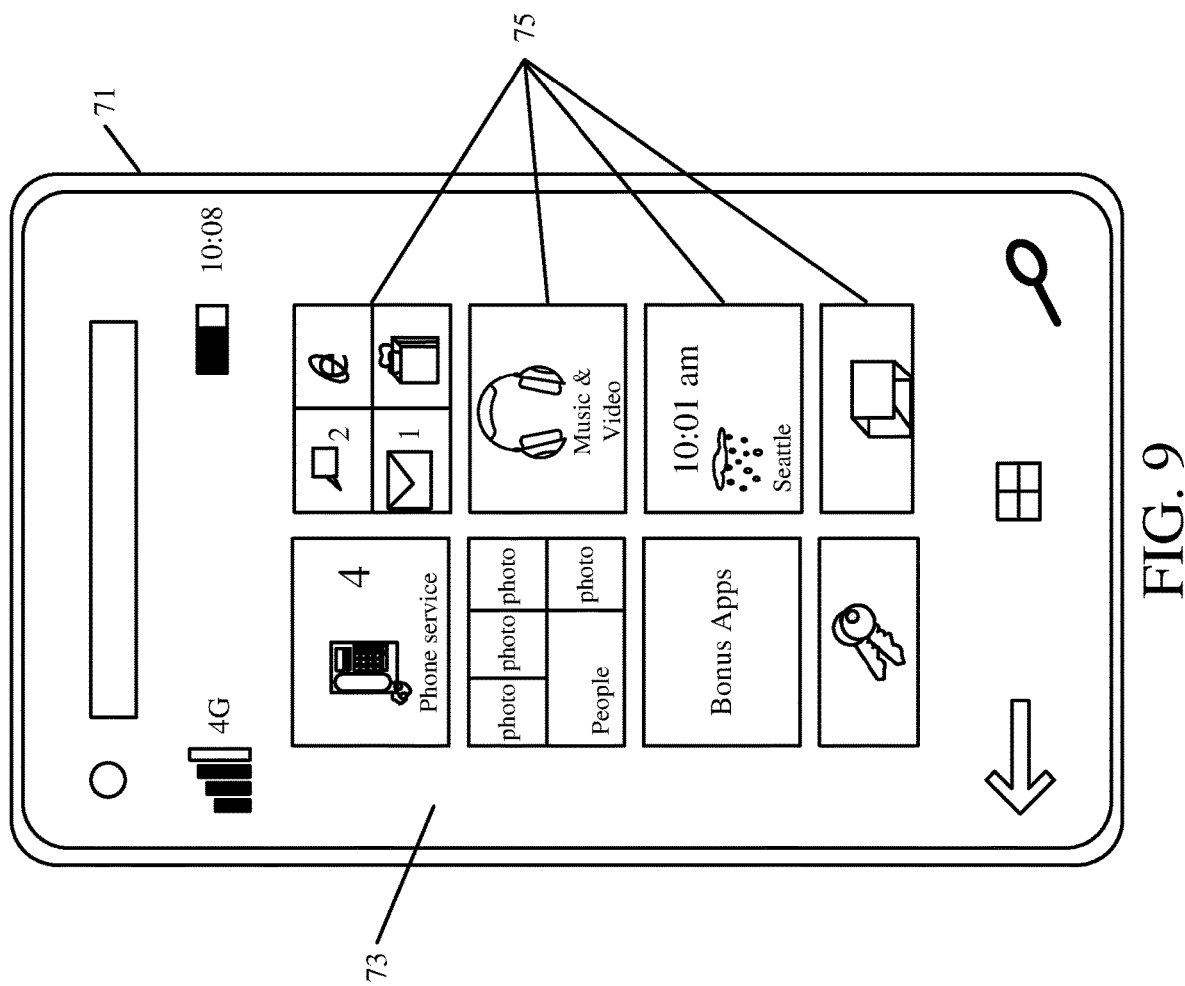

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the control operations. FIGS. 8-9 are examples of handheld or mobile devices.

FIG. 7 provides a general block diagram of the components of a client device 16 that can run some components shown in FIGS. 2 and/or 4, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various example of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
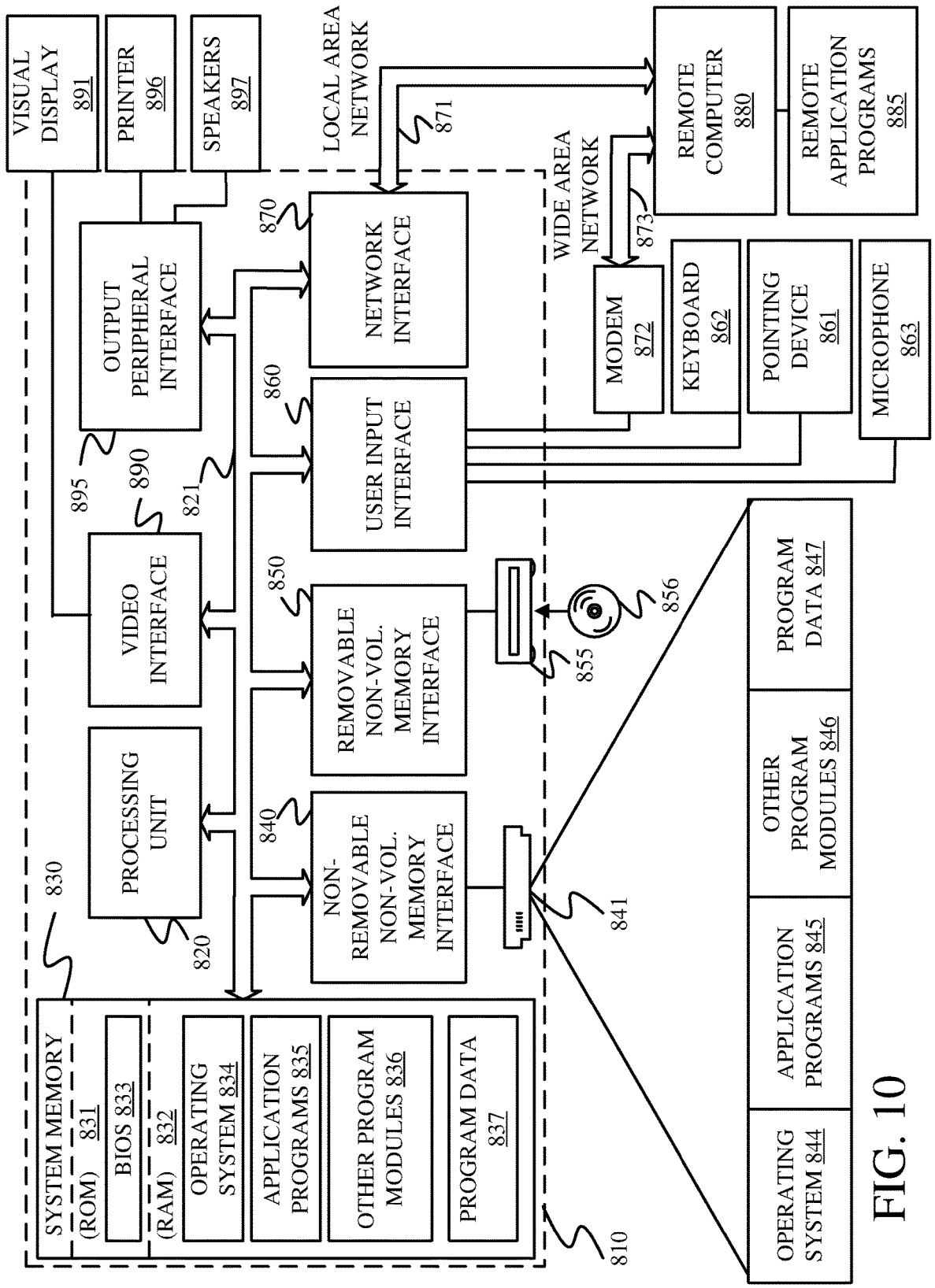
FIG. 10 is a block diagram showing one example of a computing environment that can be used in the architectures shown in the previous FIGS.

FIG. 10 is one example of a computing environment in which elements of FIGS. 2 and/or 4, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 2 and/or 4 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN, controller area network-CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a control computing system to control a mobile machine, comprising:

a dimension value identification system that receives a sensor signal sensing a value of a sensed variable and generates a first dimension value for a first dimension;

dimension gap identifier logic that identifies a machine performance gap based on a difference between the first dimension value and a target dimension value for the first dimension;

a dependent dimension processing system that identifies a second dimension, that has a second dimension value that is dependent on the first dimension value according to a first dependency relationship and quantifies, based on the first dependency relationship, a predicted change in the second dimension value based on a change in machine operation that moves the first dimension value to the target dimension value;

change aggregation logic that aggregates the quantified, predicted change in the second dimension value with the performance gap, in given units based on an evaluation criterion, to identify an aggregate machine performance change, in the given units;

a machine control component that identifies a machine control operation based on the aggregate machine performance change; and control signal generator logic that generates a control signal to perform the machine control operation.

Example 2 is the control computing system of any or all previous examples and further comprising:

a reference data selection system configured to automatically filter a set of reference data based on a set of filter criteria to obtain a set of relevant reference data.

Example 3 is the control computing system of any or all previous examples wherein the dimension gap identifier logic comprises:

target value identifier logic configured to identify the target dimension value from the relevant reference data; and comparison logic configured to identify the difference between the first dimension value and the target dimension value for the first dimension.

Example 4 is the control computing system of any or all previous examples wherein the machine control component comprises:

aggregate change evaluation logic configured to evaluate the aggregate machine performance change, in the given units, relative to the evaluation criterion to determine whether the change in machine operation is to be performed.

Example 5 is the control computing system of any or all previous examples wherein the aggregate change evaluation logic is configured to evaluate aggregate machine performance changes relative to a plurality of different evaluation criteria, in a plurality of different sets of units, each set of units corresponding to a different one of the plurality of different evaluation criteria, to determine whether the change in machine operation is to be performed.

Example 6 is the control computing system of any or all previous examples wherein the dependent dimension processing system comprises:

dependency accessing logic configured to access the first dependency relationship;

evaluation logic configured to evaluate the second dimension value based on the first dependency relationship and the change in machine operation that moves the first dimension value to the target dimension value, to obtain the predicted change in the second dimension value; and change quantifier logic configured to quantify the predicted change in the second dimension value to obtain the quantified, predicted change in the second dimension value.

Example 7 is the control computing system of any or all previous examples wherein the dimension value identification system comprises:

sensor selection logic configured to select a plurality of sensors based on the first dimension;

signal aggregation logic configured to aggregate a plurality of sensor signal values from the plurality of sensors to obtain aggregated sensor signal values; and dimension value generation logic that generates the first dimension value based on the aggregated sensor signal values.

Example 8 is the control computing system of any or all previous examples wherein the reference data selection system comprises:

similar machine identifier logic configured to generate a machine filter criterion indicative of a similar machine to the mobile machine;

similar worksite identifier logic configured to generate a worksite filter criterion indicative of a similar worksite to a current worksite for the mobile machine;

crop identifier logic configured to generate a crop filter criterion indicative of a current crop being operated on by the mobile machine; and condition identifier logic configured to generate a condition filter criterion indicative of conditions under which the mobile machine is operating.

Example 9 is the control computing system of any or all previous examples wherein the reference data selection system comprises:

filtering logic configured to automatically filter the set of reference data based on the machine filter criterion, the worksite filter criterion, the crop filter criterion and the condition filter criterion to obtain the set of relevant reference data.

Example 10 is a computer implemented method, comprising:

receiving a sensor signal indicating a value of a sensed variable that is sensed at a mobile machine;

generating a first dimension value for a first dimension based on the value of the sensed variable;

identifying a machine performance gap based on a difference between the first dimension value and a target dimension value for the first dimension;

identifying a second dimension, that has a second dimension value that is dependent on the first dimension value according to a first dependency relationship;

quantifying, based on the first dependency relationship, a predicted change in the second dimension value based on a change in machine operation that moves the first dimension value to the target dimension value;

aggregating the quantified, predicted change in the second dimension value with the performance gap, in given units based on an evaluation criterion, to identify an aggregate machine performance change, in the given units;

identifying a machine change operation based on the aggregate machine performance change; and surfacing an indication of the machine change operation.

Example 11 is the computer implemented method of any or all previous examples wherein surfacing comprises:

surfacing the indication of the machine change operation at a remote computing system that is remote from the mobile machine.

Example 12 is the computer implemented method of any or all previous examples wherein surfacing comprises:

aggregating machine performance changes across multiple machines to obtain a fleet aggregate change in the given units; and surfacing the fleet aggregate change.

Example 13 is the computer implemented method of any or all previous examples and further comprising:

automatically filtering a set of reference data based on a set of filter criteria to obtain a set of relevant reference data.

Example 14 is the computer implemented method of any or all previous examples wherein identifying a machine performance gap comprises:

identifying the target dimension value from the relevant reference data; and comparing the first dimension value to the target dimension value for the first dimension to identify the difference.

Example 15 is the computer implemented method of any or all previous examples wherein identifying a machine control operation comprises:

evaluating the aggregate machine performance change, in the given units, relative to the evaluation criterion; and based on the evaluation, determining whether the change in machine operation is to be performed.

Example 16 is the computer implemented method of any or all previous examples wherein evaluating the aggregate machine performance change comprises:

evaluating aggregate machine performance changes relative to a plurality of different evaluation criteria, in a plurality of different sets of units, each set of units corresponding to a different one of the plurality of different evaluation criteria, to determine whether the change in machine operation is to be performed.

Example 17 is the computer implemented method of any or all previous examples wherein quantifying a predicted change in the second dimension value comprises:

accessing the first dependency relationship from a dimension dependency store;

evaluating the second dimension value based on the first dependency relationship and the change in machine operation that moves the first dimension value to the target dimension value, to obtain the predicted change in the second dimension value; and quantifying the predicted change in the second dimension value to obtain the quantified, predicted change in the second dimension value.

Example 18 is the computer implemented method of any or all previous examples wherein generating a first dimension value comprises:

selecting a plurality of sensors based on the first dimension;

aggregating a plurality of sensor signal values from the plurality of sensors to obtain aggregated sensor signal values; and generating the first dimension value based on the aggregated sensor signal values.

Example 19 is a mobile machine, comprising:

a set of controllable subsystems;

a sensor configured to sense a sensed variable and generate a sensor signal indicative of a value of the sensed variable;

a dimension value identification system that receives the value of the sensed variable and generates a first dimension value for a first dimension;

dimension gap identifier logic that identifies a machine performance gap based on a difference between the first dimension value and a target dimension value for the first dimension;

a dependent dimension processing system that identifies a second dimension, that has a second dimension value that is dependent on the first dimension value according to a first dependency relationship and quantifies, based on the first dependency relationship, a predicted change in the second dimension value based on a change in machine operation that moves the first dimension value to the target dimension value;

change aggregation logic that aggregates the quantified, predicted change in the second dimension value with the performance gap, in given units based on an evaluation criterion, to identify an aggregate machine performance change, in the given units;

a machine control component that identifies a machine control operation based on the aggregate machine performance change;

control signal generator logic that generates a control signal to control at least one of the set of controllable subsystems to perform the machine control operation.

Example 20 is the mobile machine of any or all previous examples and further comprising:

a reference data selection system configured to automatically filter a set of reference data, stored at a remote reference data store, based on a set of filter criteria to obtain a set of relevant reference data, the dimension gap identifier logic identifying the target dimension value based on the set of relevant reference data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control computing system to control a mobile machine, comprising:
    a dimension value identification system that receives a sensor signal sensing a value of a sensed variable and generates a first dimension value for a first dimension of performance of the mobile machine;
    dimension gap identifier logic that identities a machine performance gap based on a difference between the first dimension value and a target dimension value for the first dimension of performance of the mobile machine;
    a dependent dimension processing system that identifies a second dimension of performance of the mobile machine, that has a second dimension value that is dependent on the first dimension value according to a first dependency relationship and quantifies, based on the first dependency relationship, a predicted change in the second dimension value based on a change in machine operation that moves the first dimension value to the target dimension value;
    change aggregation logic that aggregates the quantified, predicted change in the second dimension value with the machine performance gap, in given units based on an evaluation criterion, to identify an aggregate machine performance change, in the given units;
    a machine control component that identifies a machine control operation based on the aggregate machine performance change; and
    control signal generator logic that generates a control signal to perform the machine control operation.

2. The control computing system of claim 1 and further comprising:
    a reference data selection system configured to automatically filter a set of reference data based on a set of filter criteria to obtain a set of relevant reference data.

3. The control computing system of claim 2 wherein the dimension gap identifier logic comprises:
    target value identifier logic configured to identify the target dimension value from the relevant reference data; and
    comparison logic configured to identify the difference between the first dimension value and the target dimension value for the first dimension.

4. The control computing system of claim 3 wherein the machine control component comprises:
    aggregate change evaluation logic configured to evaluate the aggregate machine performance change, in the given units, relative to the evaluation criterion to determine whether the change in machine operation is to be performed.

5. The control computing system of claim 4 wherein the aggregate change evaluation logic is configured to evaluate aggregate machine performance changes relative to a plurality of different evaluation criteria, in a plurality of different sets of units, each set of units corresponding to a different one of the plurality of different evaluation criteria, to determine whether the change in machine operation is to be performed.

6. The control computing system of claim 1 wherein the dependent dimension processing system comprises:
    dependency accessing logic configured to access the first dependency relationship;
    evaluation logic configured to evaluate the second dimension value based on the first dependency relationship and the change in machine operation that moves the first dimension value to the target dimension value, to obtain the predicted change in the second dimension value; and
    change quantifier logic configured to quantify the predicted change in the second dimension value to obtain the quantified, predicted change in the second dimension value.

7. The control computing system of claim 1 wherein the dimension value identification system comprises:
    sensor selection logic configured to select a plurality of sensors based on the first dimension;
    signal aggregation logic configured to aggregate a plurality of sensor signal values from the plurality of sensors to obtain aggregated sensor signal values; and
    dimension value generation logic that generates the first dimension value based on the aggregated sensor signal values.

8. The control computing system of claim 2 wherein the reference data selection system comprises:
    similar machine identifier logic configured to generate a machine filter criterion indicative of a similar machine to the mobile machine;
    similar worksite identifier logic configured to generate a worksite filter criterion indicative of a similar worksite to a current worksite for the mobile machine;

crop identifier logic configured to generate a crop filter criterion indicative of a current crop being operated on by the mobile machine; and condition identifier logic configured to generate a condition filter criterion indicative of conditions under which the mobile machine is operating.

9. The control computing system of claim 8 wherein the reference data selection system comprises:

filtering logic configured to automatically filter the set of reference data based on the machine filter criterion, the worksite filter criterion, the crop filter criterion and the condition filter criterion to obtain the set of relevant reference data.

10. A computer implemented method, comprising:

receiving a sensor signal indicating a value of a sensed variable that is sensed at a mobile machine;

generating a first dimension value for a first dimension of performance of the mobile machine based on the value of the sensed variable;

identifying a machine performance gap based on a difference between the first dimension value and a target dimension value for the first dimension of performance of the mobile machine;

identifying a second dimension of performance of the mobile machine, that has a second dimension value that is dependent on the first dimension value according to a first dependency relationship;

quantifying, based on the first dependency relationship, a predicted change in the second dimension value based on a change in machine operation that moves the first dimension value to the target dimension value;

aggregating the quantified, predicted change in the second dimension value with the performance gap, in given units based on an evaluation criterion, to identify an aggregate machine performance change, in the given units;

identifying a machine change operation based on the aggregate machine performance change; and surfacing an indication of the machine change operation.

11. The computer implemented method of claim 10 wherein surfacing comprises:

surfacing the indication of the machine change operation at a remote computing system that is remote from the mobile machine.

12. The computer implemented method of claim 11 wherein surfacing comprises:

aggregating machine performance changes across multiple machines to obtain a fleet aggregate change in the given units; and surfacing the fleet aggregate change.

13. The computer implemented method of claim 10 and further comprising:

automatically filtering a set of reference data based on a set of filter criteria to obtain a set of relevant reference data.

14. The computer implemented method of claim 13 wherein identifying a machine performance gap comprises:

identifying the target dimension value from the relevant reference data; and comparing the first dimension value to the target dimension value for the first dimension of performance of the mobile machine to identify the difference.

15. The computer implemented method of claim 14 wherein identifying a machine control operation comprises:

evaluating the aggregate machine performance change, in the given units, relative to the evaluation criterion; and based on the evaluation, determining whether the change in machine operation is to be performed.

16. The computer implemented method of claim 15 wherein evaluating the aggregate machine performance change comprises:

evaluating aggregate machine performance changes relative to a plurality of different evaluation criteria, in a plurality of different sets of units, each set of units corresponding to a different one of the plurality of different evaluation criteria, to determine whether the change in machine operation is to be performed.

17. The computer implemented method of claim 10 wherein quantifying a predicted change in the second dimension value comprises:

accessing the first dependency relationship from a dimension dependency store;

evaluating the second dimension value based on the first dependency relationship and the change in machine operation that moves the first dimension value to the target dimension value, to obtain the predicted change in the second dimension value; and quantifying the predicted change in the second dimension value to obtain the quantified, predicted change in the second dimension value.

18. The computer implemented method of claim 10 wherein generating a first dimension value comprises:

selecting a plurality of sensors based on the first dimension of performance of the mobile machine;

aggregating a plurality of sensor signal values from the plurality of sensors to obtain aggregated sensor signal values; and generating the first dimension value based on the aggregated sensor signal values.

19. A mobile machine, comprising:

a set of controllable subsystems;

a sensor configured to sense a sensed variable and generate a sensor signal indicative of a value of the sensed variable;

a dimension value identification system that receives the value of the sensed variable and generates a first dimension value for a first dimension of performance of the mobile machine;

dimension gap identifier logic that identifies a machine performance gap value based on a difference between the first dimension value and a target dimension value for the first dimension of performance of the mobile machine;

a machine control component that identifies a prospective change in machine operation to move the first dimension value to the target dimension value;

a dependent dimension processing system that identifies a second dimension of performance of the mobile machine, that has a second dimension value that is dependent on the first dimension value according to a first dependency relationship and quantifies, based on the first dependency relationship, a predicted change in the second dimension value based on the prospective change in machine operation to move the first dimension value to the target dimension value;

change aggregation logic that aggregates the quantified, predicted change in the second dimension value with the performance gap value, in given units based on an evaluation criterion, to identify an aggregate predicted machine performance change value, in the given units;

aggregate change evaluation logic that identifies a predicted improvement to an overall machine performance relative to the evaluation criterion based on the aggregate predicted machine performance change value and generates an output indicative thereof; and control signal generator logic that generates a control signal to control at least one of the set of controllable subsystems to perform the prospective change in machine operation, based on the output.

20. The mobile machine of claim 19 and further comprising:

a reference data selection system configured to automatically filter a set of reference data, stored at a remote reference data store, based on a set of filter criteria to obtain a set of relevant reference data, the dimension gap identifier logic identifying the target dimension value based on the set of relevant reference data.

\* \* \* \* \*